(No Model.)

H. STRAIT.
BICYCLE.

No. 292,961. Patented Feb. 5, 1884.

WITNESSES
F. L. Ourand
E. G. Siggers

H. Strait
INVENTOR
by C. A. Snow & Co.
Attorneys

United States Patent Office.

HIRAM STRAIT, OF TROY, NEW YORK.

BICYCLE.

SPECIFICATION forming part of Letters Patent No. 292,961, dated February 5, 1884.

Application filed October 26, 1883. (No model.)

*To all whom it may concern:*

Be it known that I, HIRAM STRAIT, a citizen of the United States, residing at Troy, in the county of Rensselaer and State of New York, have invented a new and useful Bicycle, of which the following is a specification, reference being had to the accompanying drawings.

This invention relates to bicycles; and it has for its object to construct a machine in which the well-known top-heaviness will be decreased, and thus the danger incidental to bicycle-riding will be considerably lessened.

It is a well-known fact that the bicycle, by reason of its being top-heavy, always presents a source of danger to its rider, since this defect detracts from the stability of the machine. The reason of this is that the bicycle, being top-heavy, naturally sways to and fro from one side to the other from the top, and this natural tendency of the machine lessens the steadiness and stability of the same and endangers the safety of the rider. These disadvantages I overcome by prolonging or extending the fork of an ordinary bicycle nearly to the ground, the crank-axle being journaled in arms connected to or formed with the lower end of the fork. By this construction the top-heaviness in bicycles is overcome to a considerable degree, so that the movements of the machine will be steadied and its efficiency increased.

My invention consists in the improvements above stated and in additional details of construction and combination of parts, as hereinafter fully set forth, and particularly pointed out in the claims.

Figure 1:
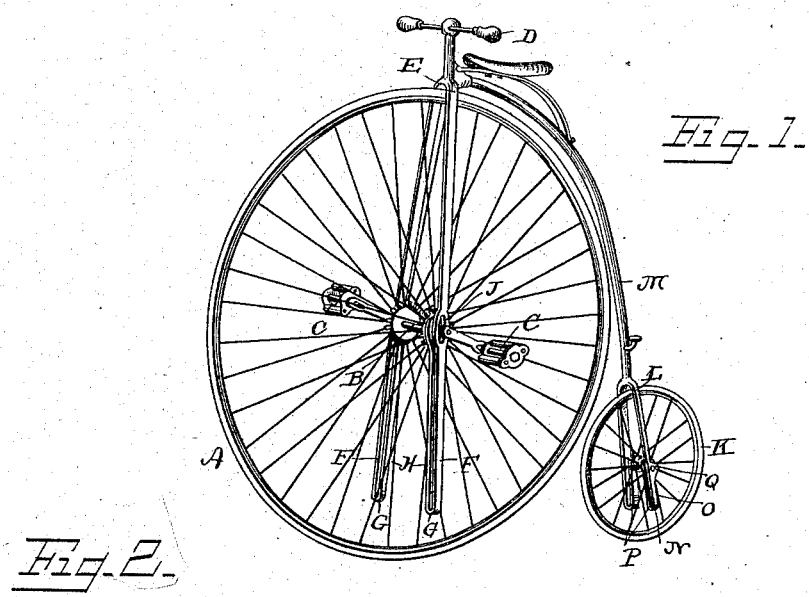
Figure 2:
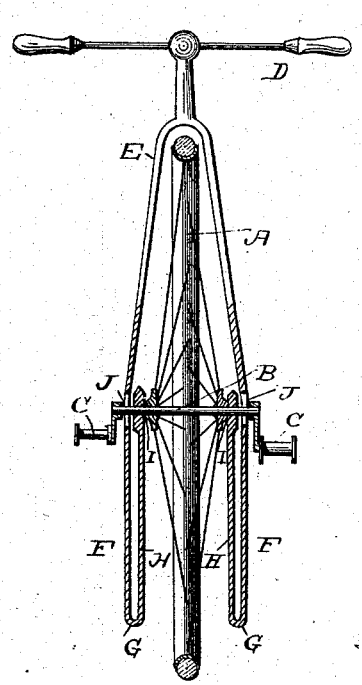
Figures 3, 4:
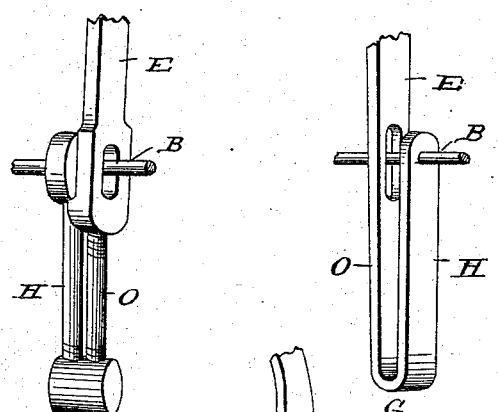
Figure 5:
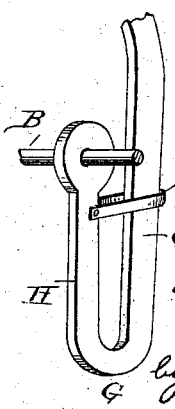

In the accompanying drawings, Figure 1 is a perspective view of a bicycle, showing my improvements applied thereto. Fig. 2 is a transverse vertical section of the same. Fig. 3 is a view illustrating a modification. Figs. 4 and 5 illustrate additional modifications.

Like letters refer to corresponding parts in the several figures.

Referring to the drawings, A designates the large front wheel, B the axle thereof, and C the foot-pedals, of a bicycle embodying the ordinary construction.

D designates the operating or steering handle connected to the upper end of fork E, the latter consisting of two arms extending downward on each side of the front wheel. In the ordinary bicycle the fork terminates at the center of the wheel, where it is connected with the axle; but in my improvements I prolong or extend the fork beyond the axle, as shown at F, so as to extend across nearly the whole diameter of the wheel. At the lower end of the extension F of the fork is formed a bend, G, having an arm, H, extending upwardly therefrom, said arm in the present instance running parallel with the extension F of the fork. The axle B passes through openings or passages I in the upper ends of the arms H, and also through elongated slots J in the fork E, the foot-pedals on the ends of the axle operating the machine in the usual manner. The small rear wheel, K, is also provided with my improved devices in a similar manner to the large front wheel. As seen, the fork L of the backbone M is extended below the axle Q of the rear wheel, as at O, a bend, N, being formed at the lower end of the extension O, and a vertical arm, P, being connected to the bend, while the axle Q passes through openings or slots in the arms P and extensions O and is secured in place at its outer end. These devices serve to lessen the top-heaviness in the small wheel, and thus, in conjunction with the improvements applied to the large wheel, cause the top-heaviness and unsteadiness of the entire bicycle to be overcome to a considerable degree.

In Fig. 3 I have departed from the construction above set forth by making the upwardly-extending arms H of a separate piece, the extensions O and arms H being connected together by a disk, S; but the function performed is the same whether the arms H are formed in one piece with the downward extensions of the fork, or whether said arms are hinged, riveted, or pivoted at the bend, or made in sections, in the manner hereinbefore described.

In Fig. 4 I have illustrated another modification, in which the upwardly-extending arms H are bent outward from their junction with the extensions O of the fork, instead of being turned inward, as shown in the remaining figures of the drawings; but, as stated above, these changes are mere matters of construction, which do not vary the function of the device, and may therefore be resorted to without departing from the spirit or scope of my invention.

The operation of my invention is obvious, and therefore need not be particularly recited here. The construction is simple, durable, and efficient, and will not materially affect the expense of the ordinary bicycle, while the advantages obtained by its use will add to the value of the machine.

In Fig. 5 another modification of the construction is seen, in which the upwardly-extending arms H are bent forward or backward from their junction with the fork, a link, chain, band, or equivalent device, S, being permanently connected to the upper ends of the arms H, and arranged to slide freely on the downward extensions O of the fork. By means of this link S the arms H are held from working outward and the strain at the junction of the arms with the fork is obviated. This link or band may be applied to the construction shown in the remaining figures of the drawings for the same purpose as found desirable.

Having thus described my invention, I claim as new—

1. In a bicycle, the fork prolonged or extended below the axle, the lower end of the extension of the fork being extended upward, so as to connect with the axle, as and for the purpose set forth.

2. In a bicycle, the fork prolonged or extended below the axle, and upwardly-extending arms connecting with the lower end of the fork, as set forth.

3. In a bicycle, the fork prolonged or extended below the axle, and upwardly-extending arms connecting with the lower end of the fork, the axle passing through openings or slots formed in the arms and the fork, as set forth.

4. In a bicycle, the fork prolonged or extended below the axle, upwardly-extending arms connecting with the axle, and a link, chain, or equivalent device connecting the arms to the fork, as set forth.

In testimony that I claim the foregoing as my own I have hereto affixed my signature in presence of two witnesses.

HIRAM STRAIT.

Witnesses:
JOSEPH B. PHELPS,
CHAS. H. TYLER.